Patented Mar. 24, 1942

2,277,163

UNITED STATES PATENT OFFICE 2,277,163

TREATMENT OF ARTIFICIAL TEXTILE MATERIALS

Percy Frederick Combe Sowter and Richard Gilbert Perry, Spondon, near Derby, England, assignors to Celanese Corporation of America, a corporation of Delaware No Drawing. Application August 14, 1940, Serial No. 352,632. In Great Britain September 15, 1939

5 Claims. (Cl. 8—131)

This invention relates to the treatment of artificial textile materials and more particularly to processes for modifying the properties of artificial fibres, filaments, threads, yarns, fabrics, ribbons and the like made of or containing an organic derivative of cellulose.

It has been found that the properties of artificial textile materials made of or containing an organic derivative of cellulose may be modified by treating them, in the absence of tension sufficient to stretch them, with media containing a latent solvent for the organic derivative of cellulose in admixture with water and/or an organic hydroxyl-containing compound.

Latent solvents are swelling agents which, though incapable in the pure condition of dissolving the cellulose derivative, become solvents when mixed with a comparatively small proportion of another liquid. Among such latent solvents are, for example, methylene chloride, ethylene chloride and ethyl acetate. If desired, two or more latent solvents may be employed in admixture in the treatment medium and the medium may also contain other agents capable of modifying the properties of the textile materials, such as, for example, solvents and swelling agents for the cellulose derivative.

Among the organic hydroxyl-containing compounds which may be employed in the treatment media, it is preferred to employ simple aliphatic monohydric alcohols, such as, for example, methyl and ethyl alcohols and their homologues. However, other organic hydroxylic compounds, for example, the polyhydric alcohols, e. g., glycol and glycerol, which are themselves substantially without action on the treated materials, may also be employed. Advantageously water is also present in treatment media comprising such organic hydroxylic compounds. Indeed, it has been found that very satisfactory results may be obtained by employing a medium which comprises a latent solvent, an organic hydroxylic compound and a large proportion, e. g. 80% to 90%, of water. This method presents a substantial economy over the methods of treating cellulose derivative materials with wholly organic media. The treatment media according to the invention may even comprise water and a latent solvent in the entire absence of organic hydroxylic compounds. If desired, the treatment medium may be diluted with other appropriate substances. For example benzene, toluene and other cyclic hydrocarbons, benzine, petroleum ether and other aliphatic hydrocarbons, or halogenated compounds may be employed in suitable proportions such that a homogeneous mixture is produced with the other constituents of the treatment medium, provided that these diluents are inert, or substantially inert, towards the cellulose derivatives.

The particular latent solvents, the particular hydroxyl-containing compounds and any other components of the treatment medium, the concentration in which these are employed, and the temperature of treatment, will depend upon the particular cellulose derivative which is present in the filaments or other materials being treated, upon the physical characteristics of those materials, and upon the degree of modification of the characteristics which is desired.

By treating cellulose derivative filaments, threads, yarns, fabrics, ribbons and the like with treatment media according to the invention, there may be produced a considerable increase in the extensibility of the materials. Preferably the treatment medium is applied while the cellulose derivative materials are free from tension or are under so slight a tension that they are free to shrink under the influence of the treatment medium. If, however, the medium is applied while the materials are under relatively high tension, the tension should subsequently be reduced or removed so that the materials are allowed to shrink while they are still under the influence of the medium.

Advantageously, shrinkage of continuous filamentary materials or the like effected according to the invention does not exceed about 20 or 25% and it is generally preferred to effect a shrinkage of 10–15%. Shrinkage may be restricted as desired by suitably modifying the treatment medium as regards composition, concentration and/or temperature, and/or by treating the materials while they are under sufficient tension to prevent more than the desired shrinkage. When employing the second of these methods the tension should be maintained so long as the materials remain under the influence of the active treatment medium.

The actual composition of the treatment media will depend, as indicated above, upon one or more of a number of factors. However, as examples of media which are found to produce satisfactory increases in extensibility in filaments and like textile materials which have a basis of acetone-soluble cellulose acetate, the following mixtures are mentioned:

1. Water containing from about 4% to about 6% of ethyl acetate.

2. Water containing about 6-8% of ethyl acetate and 4-6% of ethyl alcohol.

3. A mixture of about 60-90 parts of ethyl alcohol, 9-3 parts of ethyl acetate and 31-7 parts of water, especially about 82 parts of ethyl alcohol, 8 parts of ethyl acetate and 10 parts of water. In general, it is preferred to work at temperatures of the order of 20-25° C., and the above mixtures are particularly suitable for use at such temperatures. However, temperatures of treatment may range, for example, from −5° to +50° C. or even more, according to the concentration and nature of the treatment media.

The treatment media according to the invention may be employed in any of the methods described, for example, in U. S. Patents Nos. 2,058,422 and 2,070,583. The invention is most advantageously applied to filaments, threads, fibres, yarns, fabrics, ribbons and the like containing or derived from high-tenacity wet-spun material or materials which have been stretched to 200% or more of their original length in hot water or wet steam or in a medium containing an organic solvent or swelling agent. However, the invention is not limited to the treatment of these materials but is applicable generally to organic derivative of cellulose materials, the extensibility of which it is desired to increase.

It has also been found that substantial improvements in the properties of staple fibres having a basis of an organic derivative of cellulose may be produced by applying the treatment media to such fibres. Thus, staple fibres in the form of a sliver or roving or of a loose mass of fibres or in any other condition in which the individual fibres are substantially free to contract may be treated according to the invention to produce a crinkled or crimped effect which greatly enhances their spinning qualities. The crinkle or crimp resulting staple fibres which have been produced by cutting operations from continuous filamentary materials is particularly satisfactory. The invention is of particular value, for example, when applied to staple fibres which have been produced by cutting filamentary materials which have been stretched to increase their tenacity, for example as described above.

The composition of the treatment medium and its temperature may be varied according to the degree of crimp or crinkle desired. In general, media similar to those described above with reference to shrinkage will be found most advantageous, and temperatures of the order of 20-25° C. are preferred, the degree of crinkle increasing with rise of temperature.

The fibres are preferably crinkled by immersing them in the treatment medium until a sufficient degree of crinkle has been secured, e. g. for 10-20 minutes. Advantageously the fibres are agitated during or throughout the treatment. After treatment the medium may be run off from the fibres and the latter dried by evaporation, e. g., in a stream of warm air, due regard being paid to the nature of the active agent and of any diluents employed so that adhesion of the fibres to each other is avoided. Alternatively, the fibres may be freed from adhering medium by washing with an inert liquid with which it is miscible, e. g., one or more of the diluents present in the medium.

After the staple fibres have been freed or substantially freed from treatment medium they may be carded, if necessary, and then spun into yarns by any suitable method. Preferably conditioning and/or de-electrifying agents are applied to the fibres before carding and spinning so as to facilitate these operations. Such agents may be, for example, hygroscopic polyhydric alcohols or hygroscopic salts.

The invention is of the greatest importance in connection with the treatment of materials having a basis of acetone-soluble cellulose acetate, to which reference has been made above. However, materials made from other cellulose acetates or from other esters of cellulose such as, for example, cellulose formate, cellulose propionate and cellulose butyrate, and mixed esters, e. g., cellulose aceto-propionate and aceto-butyrate, and also from cellulose ethers, e. g., methyl, ethyl and benzyl cellulose or from cellulose ether-esters, may be treated.

The following examples illustrate the invention:

*Example 1*

Hanks of cellulose acetate yarns, composed of filaments which have been stretched to 500% of their original length in wet steam, are immersed for 15 minutes at 23° C. in a bath of 8 parts by weight of ethyl acetate, 82 parts by weight of ethyl alcohol and 10 parts by weight of water. The hanks are then withdrawn from the bath, squeezed between press rollers to remove most of the liquid, washed with aqueous alcohol, again squeezed, and finally dried in a current of warm air. This treatment is found to produce improved extensibility in the yarns which renders them more satisfactory for subsequent weaving, knitting or like operations.

*Example 2*

A loose mass of staple fibre, which has been produced by cutting high tenacity cellulose acetate filaments, is immersed in a bath of 8 parts by weight of ethyl acetate, 6 parts by weight of ethyl alcohol and 86 parts by weight of water at 20° C. and agitated therein for 15 minutes. The staple fibre is then squeezed between press rollers, washed with water, again squeezed and dried in a current of warm air. After the application of a suitable conditioning and de-electrifying medium, the fibre is carded and spun to form a yarn which is found to possess good tenacity and extensibility.

The expression "unassociated form" used in the claims is intended to exclude the treatment of the materials after their association into woven or other fabrics.

Having described our invention, what we desire to secure by Letters Patent is:

1. Process for the crimping of artificial staple fiber made of an organic derivative of cellulose, which comprises subjecting the staple fiber, while in a condition in which the individual fibers are substantially free to contract, to the action of a medium comprising ethyl acetate, water and ethyl alcohol.

2. Process for the crimping of artificial staple fiber made of an organic derivative of cellulose, which comprises subjecting the staple fiber, while in a condition in which the individual fibers are substantially free to contract, to the action of a medium comprising ethyl acetate, water and ethyl alcohol at a temperature of 20-25° C.

3. Process for the crimping of artificial staple fiber made of cellulose acetate, which comprises subjecting the staple fiber, while in a condition in which the individual fibers are substantially free to contract, to the action of a medium comprising ethyl acetate, water and ethyl alcohol.

4. Process for the crimping of artificial staple fiber made of cellulose acetate, which comprises subjecting the staple fiber, while in a condition in which the individual fibers are substantially free to contract, to the action of a medium comprising ethyl acetate, water and ethyl alcohol at a temperature of 20–25° C.

5. Process for the crimping of artificial staple fiber made of cellulose acetate, which comprises subjecting the staple fiber, produced by cutting high tenacity cellulose acetate filaments and while in the form of a loose mass, to the action of a medium comprising 8 parts by weight of ethyl acetate, 6 parts of weight of ethyl alcohol and 86 parts by weight of water at 20° C.

PERCY FREDERICK COMBE SOWTER.
RICHARD GILBERT PERRY.

CERTIFICATE OF CORRECTION.

Patent No. 2,277,163. March 24, 1942.

PERCY FREDERICK COMBE SOWTER, ET AL.

It is hereby certified that error appears in the printed specification of the above numbered patent requiring correction as follows: Page 2, second column, line 49, beginning with the words "The expression" strike out all to and including "fabrics." in line 52; and that the said Letters Patent should be read with this correction therein that the same may conform to the record of the case in the Patent Office.

Signed and sealed this 7th day of July, A. D. 1942.

(Seal)

Henry Van Arsdale,
Acting Commissioner of Patents.